US010953892B2

(12) United States Patent
Hill et al.

(10) Patent No.: US 10,953,892 B2
(45) Date of Patent: Mar. 23, 2021

(54) SYSTEM AND METHOD FOR OPERATING A VEHICLE IN A LOW TRANSMISSION RANGE

(71) Applicant: Ford Global Technologies, LLC, Dearborn, MI (US)

(72) Inventors: Thaddeus Hill, Livonia, MI (US); Markian Oleh Diakiw, Livonia, MI (US); Jeffrey Randolph Holmes, Plymouth, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/439,279

(22) Filed: Jun. 12, 2019

(65) Prior Publication Data
US 2020/0391758 A1    Dec. 17, 2020

(51) Int. Cl.
| | | |
|---|---|---|
| *B60W 30/19* | (2012.01) | |
| *B60W 50/08* | (2020.01) | |
| *B60W 20/10* | (2016.01) | |
| *B60K 6/547* | (2007.10) | |
| *B60W 40/13* | (2012.01) | |
| *B60W 40/105* | (2012.01) | |

(52) U.S. Cl.
CPC .......... *B60W 50/082* (2013.01); *B60K 6/547* (2013.01); *B60W 20/10* (2013.01); *B60W 30/19* (2013.01); *B60W 40/105* (2013.01); *B60W 40/13* (2013.01)

(58) Field of Classification Search
CPC .... B60W 50/082; B60W 30/19; B60W 20/10; B60W 40/105; B60W 40/13; B60K 6/547
See application file for complete search history.

(56) References Cited

U.S. PATENT DOCUMENTS

| | | | |
|---|---|---|---|
| 4,671,189 A | 6/1987 | David | |
| 6,637,283 B2 | 10/2003 | Belloso | |
| 9,777,656 B1 | 10/2017 | Bowman | |
| 2005/0101437 A1* | 5/2005 | Wiethe | .................... F16H 61/21 477/120 |
| 2008/0076632 A1 | 3/2008 | Watanabe et al. | |
| 2010/0151988 A1* | 6/2010 | Tabata | ............ B60W 30/18072 477/3 |
| 2016/0297427 A1* | 10/2016 | Gibson | .................... B60K 6/48 |
| 2017/0370312 A1* | 12/2017 | Legner | ................. F02D 41/023 |
| 2018/0056969 A1* | 3/2018 | Tsuda | ...................... B60L 50/16 |

* cited by examiner

*Primary Examiner* — Justin Holmes
(74) *Attorney, Agent, or Firm* — Vincent Mastrogiacomo; McCoy Russell LLP (57) ABSTRACT

Systems and methods for operating a driveline that includes a step ratio transmission or a continuously variable transmission (CVT) that may be operated in a step ratio mode are disclosed. In one example, engagement speeds for transmission gears are adjusted as a function of vehicle mass, road grade, and requested braking torque.

19 Claims, 5 Drawing Sheets

SYSTEM AND METHOD FOR OPERATING A VEHICLE IN A LOW TRANSMISSION RANGE

FIELD

The present description relates to systems and method for operating a transmission in a low range where driveline braking may be increased. The system and methods may be suitable for powertrains that only include an internal combustion engines as a torque source and powertrains that include an internal combustion engine and an electric machine as torque sources.

BACKGROUND AND SUMMARY

A vehicle may include a transmission that may be put into a low gear range. The low gear range may provide higher levels of driveline braking during conditions where driver demand torque is low. The low gear range may also increase transmission output shaft speeds at which transmission gears are upshifted so that transmission gears may be held at engine speeds where engine torque production is greatest, thereby increasing the propulsive torque that may be delivered to a vehicle's wheels. If a human or autonomous driver engages the transmission in a low range while driver demand torque is low, the transmission output shaft speed at which the transmission is downshifted from a higher gear to a lower gear may be sufficiently high to generate a substantial amount of driveline noise and vibration. Further, the downshift may generate a larger driveline torque disturbance when the transmission is engaged in a low range since torque converter impeller speed may be higher during downshifting and since it may be more difficult to control torque transfer through gear clutches at higher driveline speeds. Therefore, it may be desirable to provide a way of operating a transmission in a low range with lower noise and vibration levels while still providing desirable levels of driveline braking.

The inventors herein have recognized the above-mentioned issues and have developed a vehicle driveline operating method, comprising: adjusting an engagement speed for a transmission gear in response to a braking torque request via a controller, where adjusting the engagement speed includes increasing the engagement speed as the braking torque request increases; and engaging the transmission gear in response to an output speed of a transmission being less than or equal to the engagement speed.

By adjusting an engagement speed of a transmission gear responsive to a braking torque request, it may be possible to provide the technical result of operating a driveline at a lower noise level, at least during some conditions. In particular, an engagement speed of a transmission gear may be lowered when a braking torque request is low so that driveline noise may be reduced when operating the transmission in a low range. Lower transmission gear engagement speeds may reduce driveline noise via lowering engine noise and electric machine noise. Even though the driveline noise and vibration may be reduced, the driveline may still provide desirable levels of braking when lower levels of braking are requested. However, if higher levels of driveline braking are requested, then the transmission gear engagement speed may be increased so that the requested braking level may be provided. In this way, driveline noise and vibration may be reduced while the driveline provides a desirable level of braking.

The present description may provide several advantages. In particular, the approach may reduce driveline noise while operating a transmission in a low range. Further, the approach may provide desirable levels of braking while operating the transmission in the low range. Further still, the approach may provide compensation for vehicle mass, requested braking, and road grade so that driveline noise and vibration may be controlled while providing desired levels of driveline braking.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
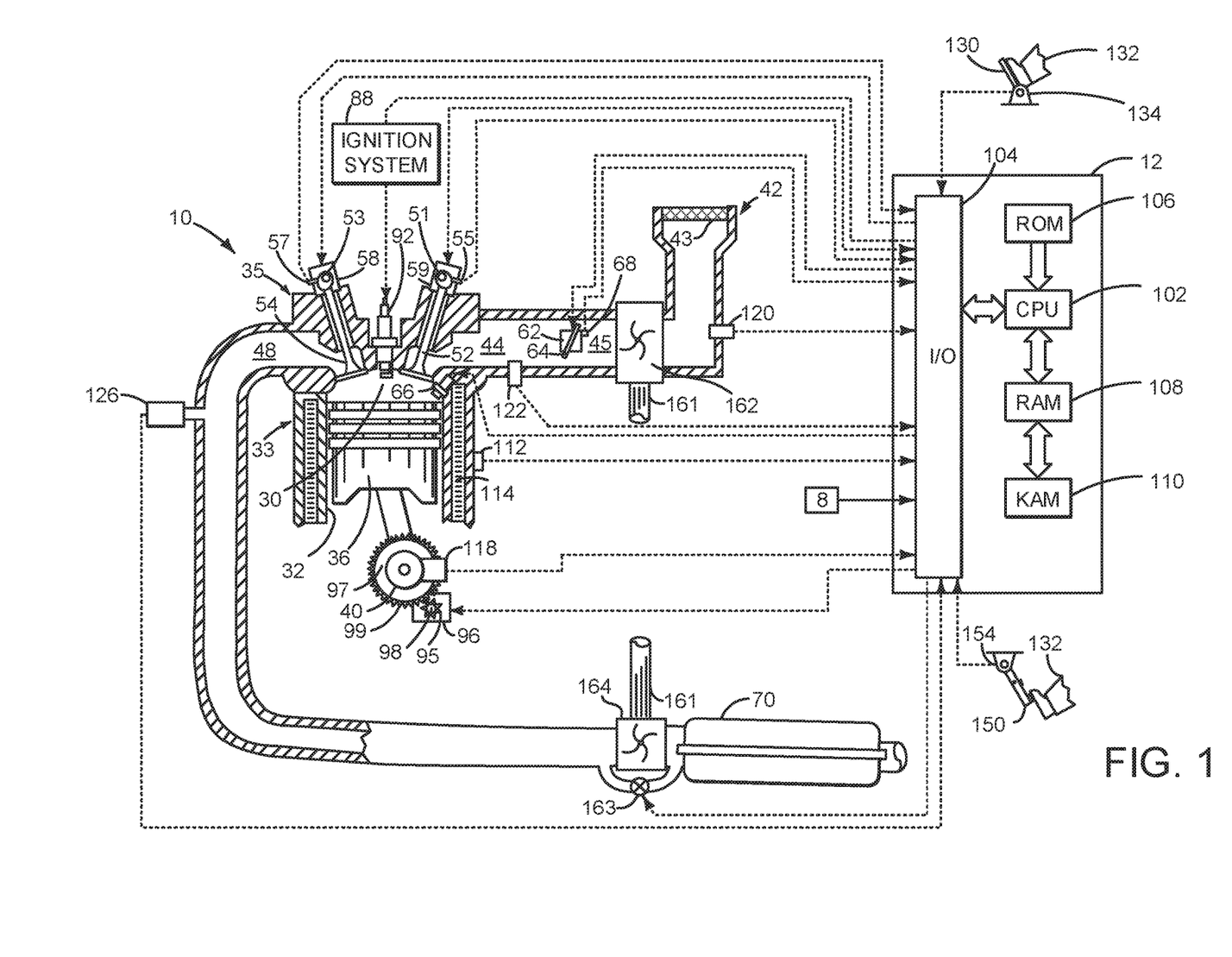
FIG. 1 is a schematic diagram of an engine.
Figure 2:
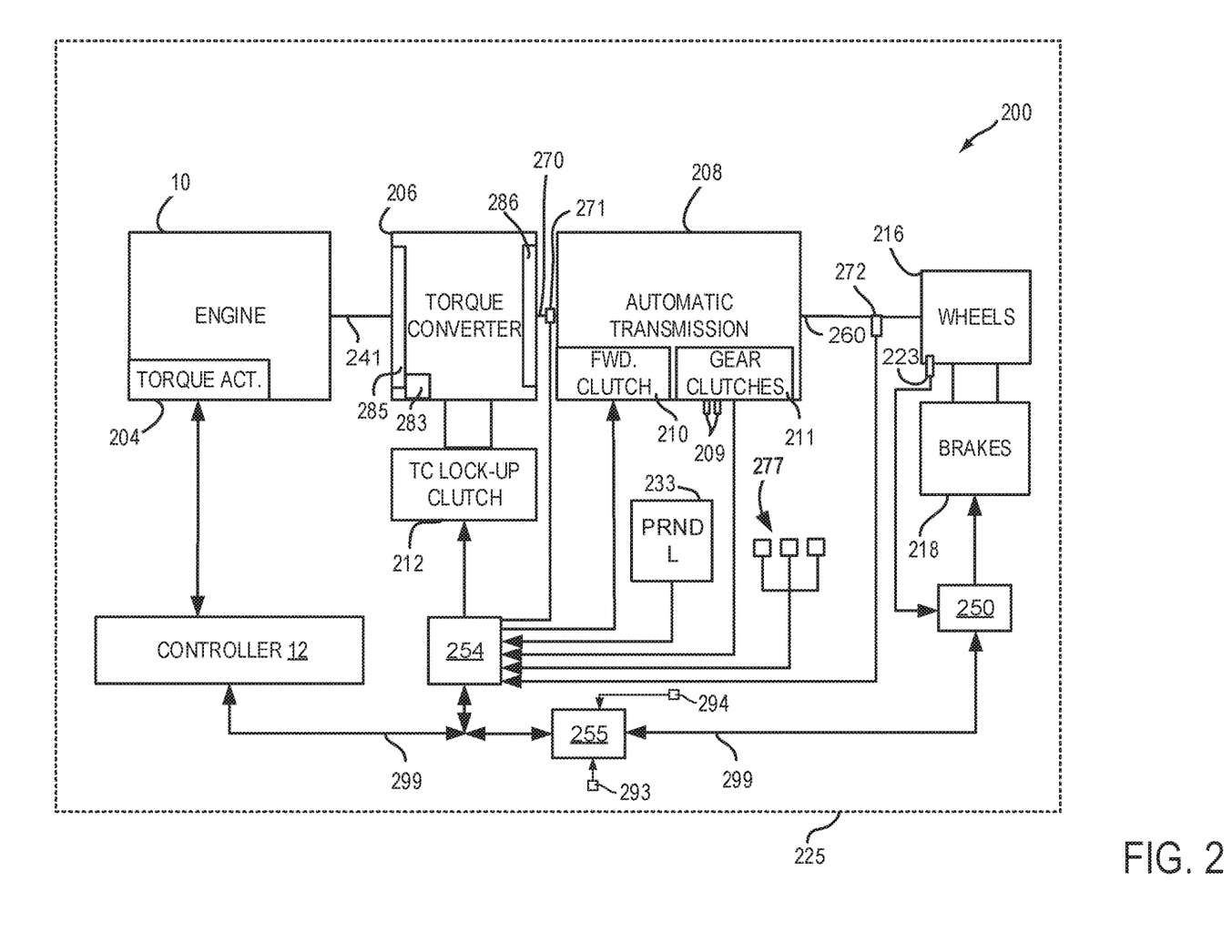
FIG. 2 is a schematic diagram of a vehicle driveline including a step ratio transmission.
Figure 3:
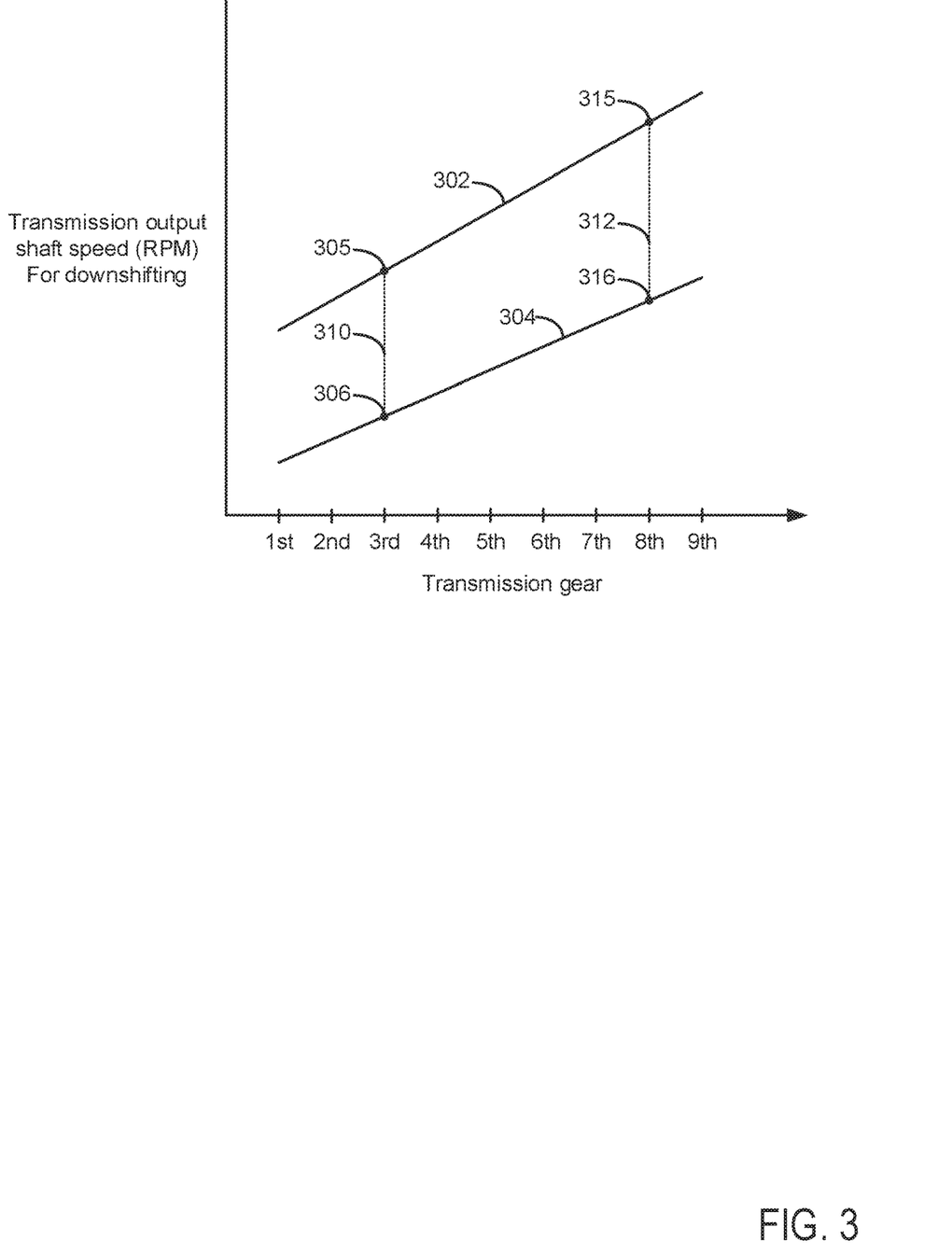
FIG. 3 shows a plot of an example high and low transmission output shaft speeds for transmission gear engagement.
Figure 4:
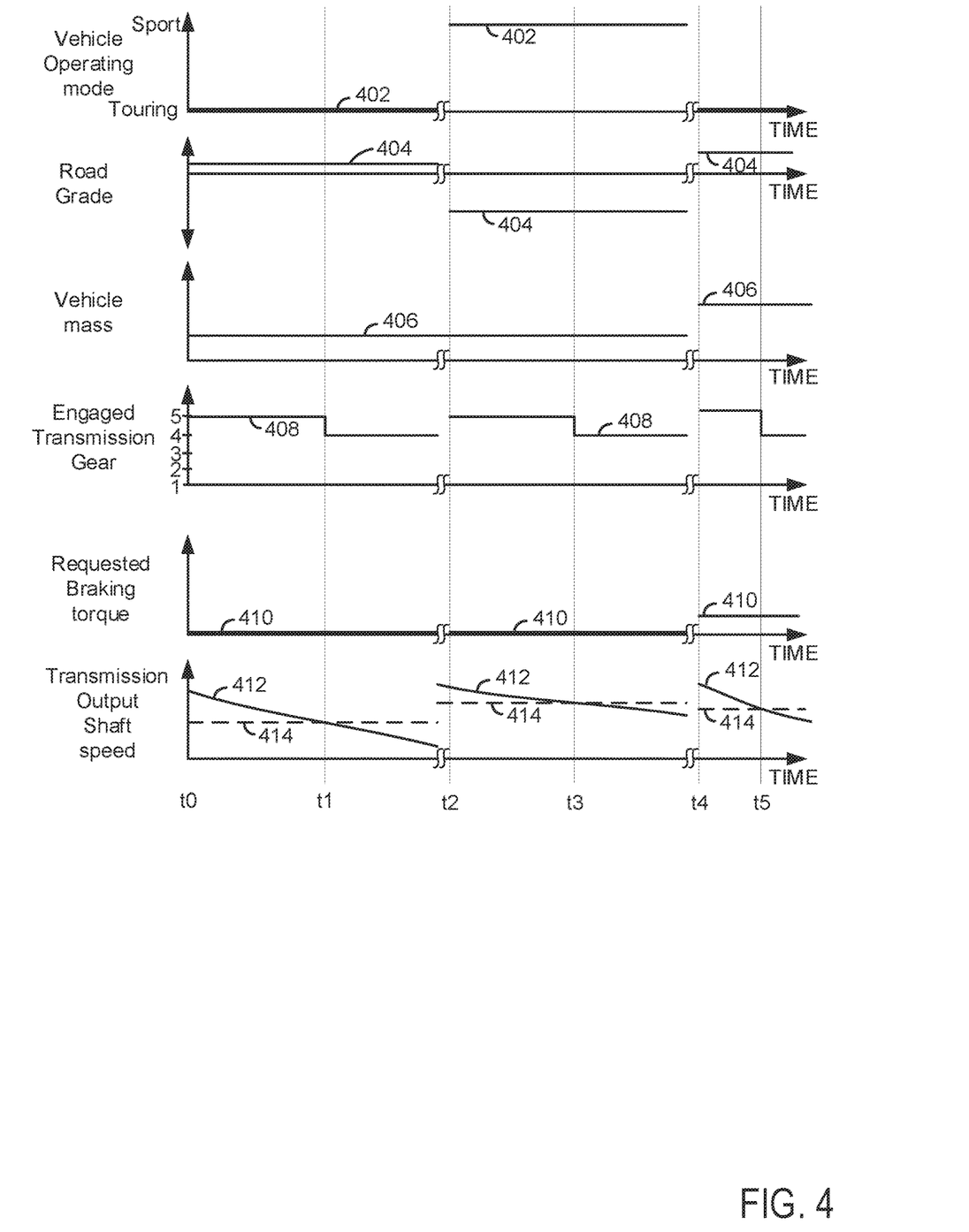
FIG. 4 shows several transmission downshifts that are based on adjustable transmission gear engagement speeds.
Figure 5:
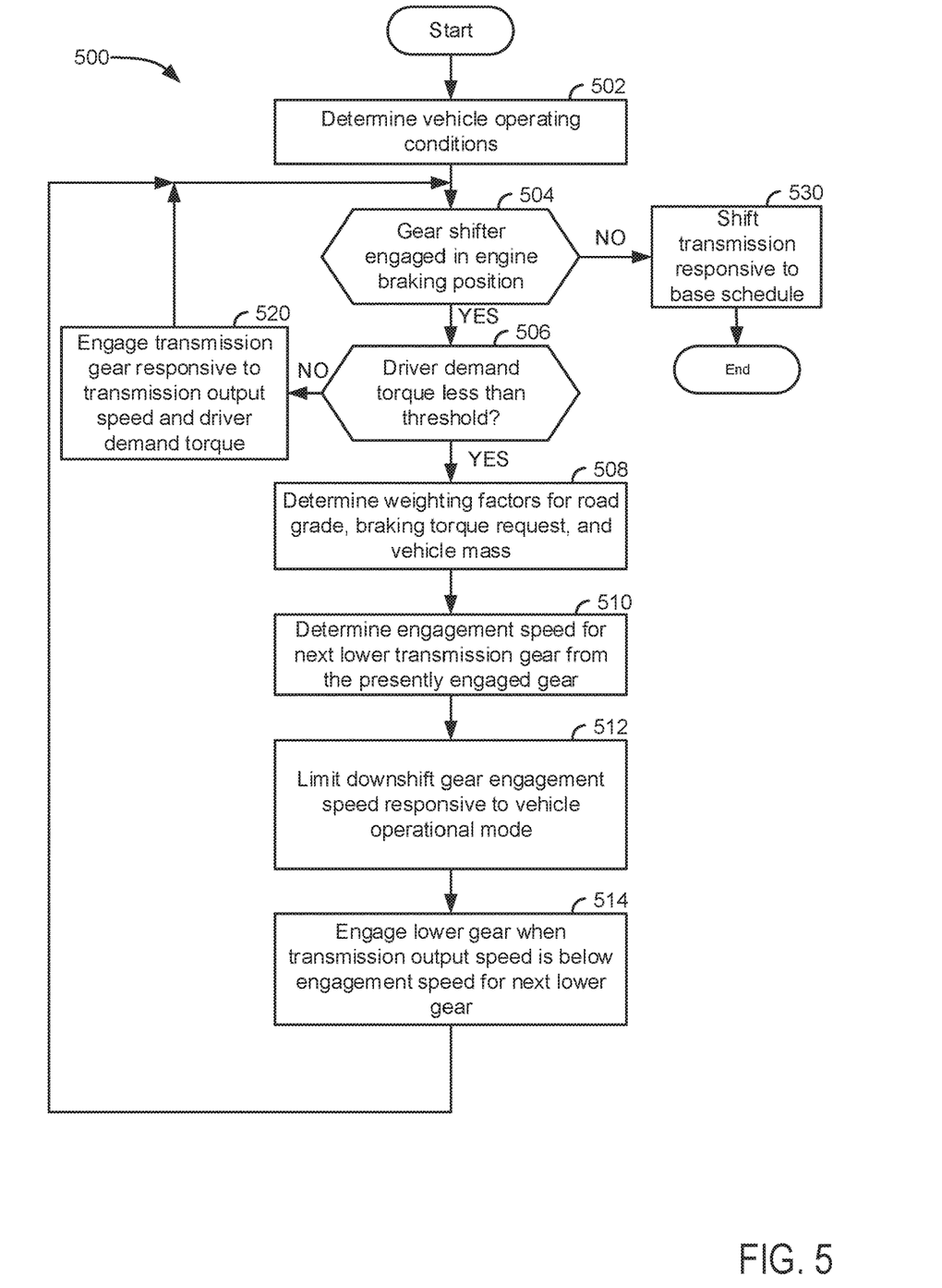
FIG. 5 shows an example method for operating a vehicle driveline.

The present description is related to controlling a transmission of a driveline. The driveline may include an internal combustion engine as shown in FIG. 1. The internal combustion engine may be included in a driveline or powertrain of a vehicle as shown in FIG. 2. Gears of the transmission may be engaged during gear downshifts according to higher and lower engagement speeds as shown in FIG. 3. Several prophetic transmission downshifts are shown in FIG. 4. Finally, a method for shifting a transmission is shown in FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A vehicle and/or engine operating mode may be selected via a human driver via human/machine interface 8. Human/machine interface may be comprised of a switch, touch screen, or other input device. The vehicle operating mode (e.g., sport or touring) may be activated via the human/machine interface 8.

Controller 12 is shown in FIG. 1 as a conventional microcomputer including: microprocessor unit 102, input/output ports 104, read-only memory 106 (e.g., non-transitory memory), random access memory 108 (e.g., transitory memory), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

In this example, powertrain 200 may be powered by engine 10. Engine 10 may be started with an engine starting system shown in FIG. 1. Further, torque of engine 10 may be adjusted via torque actuator 204, such as a fuel injector, throttle, etc. An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. Alternatively, transmission 208 may be a continuously variable transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller 254 also selectively deactivates or disengages TCC 212, gear clutches 211, and forward clutch 210. Transmission controller 254 receives input from gear or range selector 233. The transmission gear or range selector may be placed in park (P), reverse (R), neutral (N), drive (D), or low (L) and the transmission controller 254 may engage one or more gears responsive to the position of gear or range selector 233.

Further, a frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250. Vehicle system controller may also determine road grade via inclinometer 293 and vehicle mass via vehicle suspension height sensor 294.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255.

Thus, the system of FIGS. 1 and 2 provides for a system, comprising: an engine; a transmission coupled to the engine; and a controller including executable instructions stored in non-transitory memory to adjust an engagement speed for a gear of the transmission in response to a road grade, and to engage the gear in response to an output speed of the transmission being less than or equal to the engagement speed. In other examples, wheel speed or speed of another device in the driveline may be the speed to which the engagement speed is compared. The system further comprises additional instructions to adjust the engagement speed in further response to a braking torque request. The system further comprises additional instructions to adjust the engagement speed in further response to a vehicle mass. The system further comprises additional instructions to adjust the engagement speed in response to a vehicle operating mode. The system further comprises additional instructions to determine a weighting factor that is based on the road grade. The system further comprises additional instructions to determine the weighting factor that is based on a vehicle mass.

Referring now to FIG. 3, a plot of example high and low transmission output shaft speeds for transmission gear engagement is shown. The vertical axis represents transmission output shaft speed for transmission gear downshifting in units of revolutions per minute (RPM). The horizontal axis represents transmission gears and the transmission gears are labeled along the horizontal axis. Line 302 represents the high transmission output shaft speeds available for transmission gear engagement during a downshift versus transmission gear. Line 304 represents the low transmission output shaft speeds available for transmission gear engagement during a downshift versus transmission gear.

A low transmission output shaft speed for engaging $3^{rd}$ gear during a downshift from $4^{th}$ gear to $3^{rd}$ gear is indicated at 306. Thus, the transmission output shaft speed at 306 indicates a transmission output shaft speed at which $3^{rd}$ gear may be engaged during a downshift from $4^{th}$ gear to $3^{rd}$ gear when engaging $3^{rd}$ gear at a lower transmission output shaft speed is desired. A high transmission output shaft speed for engaging $3^{rd}$ gear during a downshift from $4^{th}$ gear to $3^{rd}$ gear is indicated at 305. Thus, the transmission output shaft speed at 305 indicates a transmission output shaft speed at which $3^{rd}$ gear may be engaged during a downshift from $4^{th}$ gear to $3^{rd}$ gear when engaging $3^{rd}$ gear at a higher transmission output shaft speed is desired. Line 310 indicates all of the different speeds that the transmission may be engaged into $3^{rd}$ gear when downshifting from $4^{th}$ gear to $3^{rd}$ gear. In other words, $3^{rd}$ gear may be engaged at the transmission output speeds located along the length of line 310, and the particular transmission output speed that $3^{rd}$ gear may be engaged may be a function of road grade, requested braking torque, and vehicle mass as described in FIG. 5. The range of transmission output shaft speeds at which $3^{rd}$ gear may be engaged spans the transmission output shaft speeds between line 302 and line 304, which is indicated by line 310. The transmission output shaft speeds for engagement of gears 1, 2, 4, 5, 6, 7, 8, and 9 also span the speeds between line 302 and line 304 above the appropriate gear indications along the horizontal axis. For example, the transmission output shaft speeds available for engagement of $8^{th}$ gear are indicated by line 312, where the speed at point 316 (e.g., the lower engagement speed for engaging $8^{th}$ gear) and the speed at point 315 (e.g., the higher engagement speed for engaging $8^{th}$ gear) bound the available engagement speeds for $8^{th}$ gear. Transmission output shaft speed ranges available for the other transmission gears are similar to those shown for $3^{rd}$ and $8^{th}$ gear. Thus, lines 302 and 304 bound the range of available speeds for engaging the various transmission gears.

Referring now to FIG. 4, an example vehicle operating sequence is shown. The sequence of FIG. 4 may be provided according to the method of FIG. 5 in conjunction with the system of FIGS. 1 and 2. The plots shown in FIG. 4 occur at the same time and are aligned in time. The vertical lines at times t0-t5 represent times of interest in the sequence. The SS marks along the horizontal axis represent a break in time in the sequence and the break in time may be long or short.

The first plot from the top of FIG. 4 is a plot of vehicle operating mode versus time. The vertical axis represents vehicle operating mode and the vehicle operating mode may be sport or touring as indicated along the vertical axis. The horizontal axis represents time and time increases from the left side of the figure to the right side of the figure. Trace 402 represents the vehicle operating mode.

The second plot from the top of FIG. 4 is a plot of road grade versus time. The vertical axis represents the road grade and the road grade is positive above the horizontal axis. The road grade is negative below the horizontal axis. The horizontal axis represents time and time increases from the left side of the figure to the right side of the figure. Trace 404 represents road grade.

The third plot from the top of FIG. 4 is a plot of vehicle mass versus time. The mass of the vehicle increases in the direction of the vertical axis arrow. The horizontal axis represents time and time increases from the left side of the figure to the right side of the figure. Trace 406 represents the vehicle's mass.

The fourth plot from the top of FIG. 4 is a plot of engaged transmission gear versus time. The vertical axis represents the number of the engaged transmission gear and the transmission gear numbers are listed along the vertical axis. The horizontal axis represents time and time increases from the left side of the figure to the right side of the figure. Trace 408 indicates the number of the engaged transmission gear.

The fifth plot from the top of FIG. 4 is a plot of requested braking torque versus time. The vertical axis represents the requested braking torque and the amount of the requested braking torque increases in the direction of the vertical axis arrow. The horizontal axis represents time and time increases from the left side of the figure to the right side of the figure. Trace 410 represents the amount of requested braking torque. The requested braking torque may be generated via a controller in response to accelerator pedal position and brake pedal position.

The sixth plot from the top of FIG. 4 is a plot of transmission output shaft speed versus time. The vertical axis represents the transmission output shaft speed and the transmission output shaft speed increases in the direction of the vertical axis arrow. The horizontal axis represents time and time increases from the left side of the figure to the right side of the figure. Trace 412 represents the transmission output shaft speed. Dashed line 414 represents a transmission output shaft speed at which $4^{th}$ gear may be engaged based on road grade, vehicle mass, and requested braking torque.

At time t0, the vehicle is in touring mode (e.g., a less responsive lower performance mode) and the road grade is positive and small. The vehicle mass is a lower level and the transmission is engaged in $5^{th}$ gear. The amount of requested braking torque is small. The transmission output shaft speed is at a higher level and the transmission output shaft speed is decreasing due to a low driver demand torque (not shown) and the positive road grade. The transmission output shaft speed is above threshold 414 so that the transmission may not be downshifted from $5^{th}$ gear to $4^{th}$ gear.

Between time t0 and time t1, the transmission output shaft speed declines and the vehicle remains in touring mode. The road grade is unchanged and the vehicle mass is unchanged. The transmission is engaged in $5^{th}$ gear and only a small amount of braking torque is requested.

At time t1, transmission output shaft speed is reduced to a speed that is less than threshold 414 so the transmission is downshifted from $5^{th}$ gear to $4^{th}$ gear. The transmission output shaft speed at which $4^{th}$ gear may be engaged 414 is a lower speed since road grade is positive, which tends to reduce vehicle speed, vehicle mass is low, and requested braking torque is low. Further, threshold 414 is low since the vehicle is operating in touring mode.

At time t2, the vehicle is in sport mode (e.g., a more responsive higher performance mode) and the road grade is negative and larger in magnitude. The vehicle mass is a lower level and the transmission is engaged in $5^{th}$ gear. The amount of requested braking torque is small. The transmission output shaft speed is at a higher level and the transmission output shaft speed is decreasing due to a low driver demand torque (not shown). The transmission output shaft speed is above threshold 414 so that the transmission may not be downshifted from $5^{th}$ gear to $4^{th}$ gear.

Between time t2 and time t3, the transmission output shaft speed declines and the vehicle remains in sport mode. The road grade is unchanged and the vehicle mass is unchanged. The transmission is engaged in $5^{th}$ gear and only a small amount of braking torque is requested.

At time t3, transmission output shaft speed is reduced to a speed that is less than threshold 414 so the transmission is downshifted from $5^{th}$ gear to $4^{th}$ gear. The transmission output shaft speed at which $4^{th}$ gear may be engaged 414 is a higher speed than at time t1 since road grade is negative and larger in magnitude, which tends to increase vehicle speed, vehicle mass is low, and requested braking torque is low. Further, threshold 414 is higher since the vehicle is operating in sport mode. By allowing engagement of $4^{th}$ gear at a higher transmission output shaft speed, additional driveline braking may be provided.

At time t4, the vehicle is in touring mode (e.g., a less responsive lower performance mode) and the road grade is positive and larger in magnitude. The vehicle mass is a higher level and the transmission is engaged in $5^{th}$ gear. The amount of requested braking torque is medium. The transmission output shaft speed is at a higher level and the transmission output shaft speed is decreasing due to a low driver demand torque (not shown) and the positive road grade. The transmission output shaft speed is above threshold 414 so that the transmission may not be downshifted from $5^{th}$ gear to $4^{th}$ gear.

Between time t4 and time t5, the transmission output shaft speed declines and the vehicle remains in touring mode. The road grade is unchanged and the vehicle mass is unchanged. The transmission is engaged in $5^{th}$ gear and a medium amount of braking torque is requested.

At time t5, transmission output shaft speed is reduced to a speed that is less than threshold 414 so the transmission is downshifted from $5^{th}$ gear to $4^{th}$ gear. The transmission output shaft speed at which $4^{th}$ gear may be engaged 414 is a higher speed than at time t1 since road grade is a middle level, vehicle mass is higher, and requested braking torque is medium. Further, threshold 414 is higher than at time t1, but lower than at time t. By allowing engagement of $4^{th}$ gear at a middle transmission output shaft speed, additional driveline braking may be provided without generating large amounts of driveline noise and vibration.

In this way, the transmission output shaft speed at which a transmission gear may be engaged during vehicle deceleration may be adjusted for road grade, requested brake torque, and vehicle mass. The adjustable level allows higher driveline braking when higher driveline braking may be desirable, such as when road grade is negative and large in magnitude, and lower when less braking may be desirable so that driveline noise and vibration may be more tolerable.

Referring now to FIG. 5, a method for operating a vehicle is shown. At least portions of method 500 may be implemented as executable controller instructions stored in non-transitory memory. Additionally, portions of method 500 may be actions taken in the physical world to transform an operating state of an actuator or device. The method of FIG. 5 may be incorporated into the system of FIGS. 1 and 2 as executable instructions stored in non-transitory memory.

At 502, method 500 determines vehicle operating conditions. Vehicle operating conditions may include, but are not limited to transmission output shaft speed, driver demand torque, transmission gear selector position, engine temperature, engine speed, engine load, and ambient temperature. Method 500 may determine values for these parameters via output of vehicle sensors. Method 500 proceeds to 504.

At 504, method 500 judges if the transmission gear or range selector is in a position for increasing driveline braking. In one example, driveline braking may be increased via placing the transmission gear selector into low. If method 500 judges that the transmission range selector is in a position for increasing driveline braking, the answer is yes and method 500 proceeds to 506. Otherwise, the answer is no and method 500 proceeds to 530.

At 530, method 500 shifts the transmission responsive to a base gear shift schedule. The base gear shift schedule shifts gears responsive to driver demand torque and transmission output shaft speed. The driver demand torque may be determined via referencing a table or function of empirically determined values of driver demand torque or power via accelerator pedal position and transmission output shaft speed. The base gear shift schedule requests transmission gear shifts at vehicle speeds and driver demand levels that increase driveline efficiency. Method 500 proceeds to exit after the vehicle transmission is shifted according to the base transmission shift schedule. At 506, method 500 judges if driver demand torque is less than a threshold torque. The threshold torque may be a predetermined torque level. If method 500 judges that driver demand torque is less than the threshold level, the answer is yes and method 500 proceeds to 508. Otherwise, the answer is no and method 500 proceeds to 520.

At 520, method 500 shifts the transmission responsive to a low range gear shift schedule. The low range gear shift schedule shifts gears responsive to driver demand torque and transmission output shaft speed. The low range gear shift schedule may upshift from a lower gear to a higher gear at a higher transmission output shaft speed than the base shift schedule shifts the transmission. In addition, the low range gear shift schedule may downshift from a higher gear to a lower gear at a higher transmission output shaft speed than the base shift schedule shifts the transmission. Method 500 returns to 504.

At 508, method 500 determines weighting factors for road grade, vehicle mass, and requested braking torque. In one example, method 500 estimates vehicle mass via a suspension height sensor and references or indexes a table or function of empirically determined vehicle mass weighting factors via the estimated vehicle mass. The table or function outputs the vehicle mass weighting factor, which may have a value in the range of 0-1. Similarly, method 500 estimates road grade via an inclinometer and references or indexes a table or function of empirically determined road grade weighting factors via the estimated road grade. The table or function outputs the road grade weighting factor, which may have a value in the range of 0-1. Method 500 receive a braking request and references or indexes a table or function of empirically determined braking request weighting factors. The table or function outputs the braking request weighting factor, which may have a value in the range of 0-1. It should be noted that the sum of the road grade, requested braking, and vehicle mass weighting factors may be required to be in the range of 0-1. Method 500 proceeds to 510.

At 510, method 500 determines an engagement speed for the gear having the next lower gear number than the presently engaged transmission gear. For example, if the presently engaged gear is $8^{th}$ gear, then method 500 determines the engagement speed for $7^{th}$ gear. The road grade weighting factor (rg_wht_fact) is added to the brake request weighting factor (br_wht_fact), and the result is added to the vehicle mass weighting factor (vm_wht_fact) to determine an on-coming gear weighting factor (og_wht_fact), which may be expressed via the following equation: og_wht_fact=rg_wht_fact+br_wht_fact+vm_wht_fact. The on-coming gear (e.g., the gear to be engaged) engagement speed may be determined via the following equation: og_eng_spd=low_eng_spd(1−og_wht_fact)+high_eng_spd (og_wht_fact), where og_eng_spd is the engagement speed for the gear that is to be engaged during the downshift, low_eng_spd is a low transmission output shaft speed for the gear being engaged (e.g., 306 in FIG. 3 for $3^{rd}$ gear or 316 for $8^{th}$ gear), and high_eng_spd is the high transmission output shaft speed for the transmission gear being engaged (e.g., 305 in FIG. 3 for $3^{rd}$ gear or 315 for $8^{th}$ gear). Thus, the on-coming gear engagement speed equation interpolates between values of two lines or curves (e.g., 302 and 304 of FIG. 3) to determine the engagement speed for the gear that is to be engaged during the downshift. The adjustable engagement speed may provide varying amounts of engine braking and driveline noise that are suitable to driving conditions so that large amounts of driveline noise do not occur when lower levels of driveline braking are desired or requested. Method 500 proceeds to 512 after the engagement speed for the on-coming gear or the gear to be engaged during the downshift is determined.

At 512, method 500 assigns a limit to the transmission output shaft speed at which the presently engaged gear may be disengaged and the on-coming gear may be engaged. The limited (e.g., a transmission shaft output speed above which the on-coming gear may not be engaged) speed of the transmission output shaft is a function of the vehicle's operating mode (e.g., sport mode or touring mode). The limited speed is a higher value (e.g., X RPM to engage $1^{st}$ gear) for sport mode and a lower value (e.g., X-50 RPM to engage $1^{st}$ gear) for touring mode. The final engagement speed for the gear that is to be engaged og_eng_spd_fnl is the greater value of og_eng_spd and the limit of the transmission output shaft speed at which the on-coming gear may be engaged. Method 500 proceeds to 514 after the final on-coming gear engagement speed is determined.

At 514, method 500 engages the next lower transmission gear relative to the presently engaged transmission gear when transmission output shaft speed is equal to or less than the final on-coming gear engagement speed. For example, if the final on-coming gear engagement speed is X RPM and $9^{th}$ gear is presently engaged, then $9^{th}$ gear is released and $8^{th}$ gear is engages when the transmission output shaft speed is less than X RPM. Method 500 returns to 504.

In this way, method 500 may determine a transmission output shaft engagement speed for a gear that is to be engaged during a transmission downshift. The gear that is to be engaged during the downshift may be engaged when transmission output shaft speed is less than the transmission output shaft engagement speed for the gear that is to be engaged. It should be noted that method 500 describes the engagement speed as being a speed of an output shaft of a transmission; however, the engagement speed may apply to a wheel speed or a speed of another device that is located along the driveline.

Thus, the method of FIG. 5 provides for a vehicle driveline operating method, comprising: adjusting an engagement speed for a transmission gear in response to a braking torque request via a controller, where adjusting the engagement speed includes increasing the engagement speed as the braking torque request increases; and engaging the transmission gear in response to an output shaft speed of a transmission or a wheel speed being less than or equal to the engagement speed. The method includes where the engagement speed for the transmission gear is a transmission output shaft speed at which the transmission gear is engaged when driver demand torque is less than a threshold. The method further comprises adjusting the engagement speed in further response to vehicle mass. The method includes where adjusting the engagement speed in further response to vehicle mass includes increasing the engagement speed for the transmission gear as vehicle mass increases. The method further comprises adjusting the engagement speed in further response to road grade. The method includes where adjusting the engagement speed in further response to road grade includes increasing the engagement speed for the transmission gear as a magnitude of road grade increases. The method further comprises adjusting the engagement speed in further response to a vehicle operating mode, the vehicle operating mode being a sport mode or a touring mode.

The method of FIG. 5 also provides for a vehicle driveline operating method, comprising: adjusting a weighted engagement speed for a transmission gear in response to a vehicle mass via a controller, where adjusting the weighted engagement speed includes increasing the engagement speed as the braking torque request increases, and where the adjusting includes adjusting the weighted engagement speed to a value based on a high speed transmission gear engagement speed and a low speed transmission gear engagement speed; and engaging the transmission gear in response to an output speed of a transmission being less than or equal to the engagement speed. The method includes where the high speed transmission gear engagement speed is dependent on the transmission gear being engaged. The method includes where the high speed transmission gear engagement speed increases as a gear number of the transmission gear being engaged increases. The method includes where the low speed transmission gear engagement speed is dependent on the transmission gear being engaged. The method includes where the low speed transmission gear engagement speed increases as a gear number of the transmission gear being engaged increases. The method further comprises adjusting the weighted engagement speed in further response to a vehicle operating mode, the vehicle operating mode being a sport mode or a touring mode. The method further comprises adjusting the weighted engagement speed in response to driver demand torque being less than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle driveline operating method, comprising:
adjusting an engagement speed for a transmission gear in response to a braking torque request via a controller, where adjusting the engagement speed includes increasing the engagement speed as the braking torque request increases;
engaging the transmission gear in response to an output shaft speed of a transmission being less than or equal to the engagement speed; and
adjusting the engagement speed in further response to vehicle mass, where the engagement speed for the transmission gear is a rotational speed of a transmission output shaft at which the transmission gear is engaged.

2. The method of claim 1, where the engagement speed for the transmission gear is the rotational speed of the transmission output shaft at which the transmission gear is engaged when driver demand torque is less than a threshold.

3. The method of claim 1, where adjusting the engagement speed in further response to vehicle mass includes increasing the engagement speed for the transmission gear as vehicle mass increases.

4. The method of claim 1, further comprising adjusting the engagement speed in further response to road grade.

5. The method of claim 4, where adjusting the engagement speed in further response to road grade includes increasing the engagement speed for the transmission gear as a magnitude of road grade increases.

6. The method of claim 1, further comprising adjusting the engagement speed in further response to a vehicle operating mode, the vehicle operating mode being a sport mode or a touring mode.

7. A vehicle driveline operating method, comprising:
adjusting a weighted engagement speed for a transmission gear in response to a vehicle mass via a controller, where adjusting the weighted engagement speed includes increasing the weighted engagement speed as the braking torque request increases, and where the adjusting includes adjusting the weighted engagement speed to a value based on a first transmission gear engagement speed and a second transmission gear engagement speed, wherein the first transmission gear engagement speed, the second transmission gear engagement speed, and the weighted engagement speed are rotational speeds of a transmission output shaft at which the transmission gear is engaged, and wherein the first transmission gear engagement speed is higher than the second transmission gear engagement speed; and
engaging the transmission gear in response to an output speed of a transmission being less than or equal to the adjusted weighted engagement speed.

8. The method of claim 7, where the first transmission gear engagement speed is dependent on the transmission gear being engaged.

9. The method of claim 8, where the first transmission gear engagement speed increases as a gear number of the transmission gear being engaged increases.

10. The method of claim 7, where the second transmission gear engagement speed is dependent on the transmission gear being engaged.

11. The method of claim 10, where the second transmission gear engagement speed increases as a gear number of the transmission gear being engaged increases.

12. The method of claim 7, further comprising adjusting the weighted engagement speed in further response to a vehicle operating mode, the vehicle operating mode being a sport mode or a touring mode.

13. The method of claim 7, further comprising adjusting the weighted engagement speed in response to driver demand torque being less than a threshold.

14. A system, comprising:
an engine;
a transmission coupled to the engine; and
a controller including executable instructions stored in non-transitory memory to adjust an engagement speed for a gear of the transmission in response to a road grade, and to engage the gear in response to an output speed of the transmission being less than or equal to the engagement speed, where the engagement speed for the gear of the transmission is a rotational speed of a transmission output shaft at which the gear of the transmission is engaged.

15. The system of claim 14, further comprising additional instructions to adjust the engagement speed in further response to a braking torque request.

16. The system of claim 14, further comprising additional instructions to adjust the engagement speed in further response to a vehicle mass.

17. The system of claim 14, further comprising additional instructions to adjust the engagement speed in response to a vehicle operating mode.

18. The system of claim 14, further comprising additional instructions to determine a weighting factor that is based on the road grade.

19. The system of claim 18, further comprising additional instructions to determine the weighting factor that is based on a vehicle mass.

* * * * *